United States Patent [19]

Eaton

[11] Patent Number: 5,315,810
[45] Date of Patent: May 31, 1994

[54] METHOD FOR FILLING SEED TRAYS

[76] Inventor: Jay S. Eaton, Rte. 2, Buladean, Bakersville, N.C. 28705

[21] Appl. No.: 897,242

[22] Filed: Jun. 11, 1992

[51] Int. Cl.$^5$ ............................................. B65B 01/22
[52] U.S. Cl. ........................................ 53/473; 53/431;
53/437; 47/901; 141/72; 141/283
[58] Field of Search ................ 47/1 A, 901; 111/104,
111/105; 53/246, 249, 250, 431, 437, 473, 525;
141/36, 72, 74, 78, 129, 131, 280, 283

[56] References Cited

U.S. PATENT DOCUMENTS

| | | | |
|---|---|---|---|
| 2,771,709 | 11/1956 | Ritter | 47/901 X |
| 2,869,283 | 1/1959 | Krause | 47/901 X |
| 2,884,022 | 4/1959 | Geary | 141/72 |
| 3,571,971 | 3/1971 | Broersma | 47/901 X |
| 3,726,041 | 4/1973 | Ota et al. | 47/901 X |
| 3,782,033 | 1/1974 | Hickerson | 47/901 X |
| 3,800,837 | 4/1974 | Pleus et al. | 141/131 |
| 4,020,881 | 5/1977 | Nothen | 141/131 X |
| 4,142,560 | 3/1979 | Eisenberg | 141/78 X |
| 4,363,341 | 12/1982 | Powell | 141/78 |
| 4,411,205 | 10/1983 | Rogers | 47/901 X |

FOREIGN PATENT DOCUMENTS 0251400  1/1988 European Pat. Off. .............. 47/1 A Primary Examiner—John Sipos
Assistant Examiner—Daniel Moon
Attorney, Agent, or Firm—Dority & Manning

[57] ABSTRACT

A method is provided for filling seed trays particularly tobacco seed trays, with growing filler material whereby dry pockets are prevented from forming in the seed trays. The method includes partially filling an upright loading device with the filler material in a manner so that the surface plane of the filler material is at an inclined angle of repose with respect to horizontal. A leading edge of the filler material is established and maintained from the front end of the loading device. A seed tray is passed below the loading device so that the forward edge of the seed tray initially passes below the leading edge of the filler material so that the filler material cascades down into the individual pockets of the seed tray at a controlled rate. In practicing this method, the individual pockets of the seed tray are generally completely filled from the bottom up with the filler material before being conveyed under the bulk portion of the filler material, thereby minimizing the occurrence of dry pockets.

14 Claims, 4 Drawing Sheets

METHOD FOR FILLING SEED TRAYS

BACKGROUND OF THE INVENTION

The present invention relates to a method for filling seed trays and more particularly to a method for filling tobacco seed trays whereby dry pockets are prevented from forming in the seed trays.

Generally, tobacco plants are grown from seed and when the tobacco seedlings reach a specific height, they are transplanted to the tobacco field. The tobacco seedlings can be raised from seeds in trays which float on water in, for instance, a greenhouse or similar type structure. The trays are generally rectangular in shape and have rows of individual pockets formed therein. For instance, a conventional tobacco seed tray may comprise 12 rows of 24 pockets in each row. The individual pockets are filled with filler material (organic matter, peat, etc.) specially formulated to enhance germination and growth of seedlings from the tobacco seeds.

After the pockets are filled with the filler material, divots or holes are formed in the top of the filler material of each pocket by, for example, placing a templet over the seed tray. The templet has protrusions matching the number of pockets in the seed tray, the protrusions forming the divots in the filler material. Subsequently, seeds are placed in the divots of each pocket by, for example, an automatic seeding device, and the seed tray is then floated in water. At the bottom of each pocket there is usually a hole in the seed tray so that the filler material can wick water through the hole into the pocket.

A conventional method and apparatus for filling the seed trays with filler material includes loading a hopper with the filler material and passing the seed trays under the hopper whereby the filler material drops from the hopper into the seed trays.

A major drawback of the conventional method for loading the tobacco trays with the filler material is that air voids are formed at the bottom of a substantial number of individual pockets of each tray resulting in what is commonly referred to as "dry pockets." When a dry pocket is formed, water will not wick into that pocket and the tobacco seed will not germinate. The filler material must completely fill the pocket to draw the water through the hole in the bottom of the pocket. The air space in a dry pocket will prevent wicking from occurring.

It is generally impossible to tell if dry pockets have formed in the tobacco seed trays until the trays have been floating in water for a period of time. Normally, the filler material in a particular pocket will absorb water and turn a darker shape if the pocket is properly filled. The filler material in the dry pockets will not absorb water and thus, will not darken. The pocket can be poked with, for instance, a probe or rod to allow the air to escape and the filler material to settle and completely fill the pocket but, precious time has already been lost. Additionally, it is an extremely tedious and labor intensive process to correct every dry pocket that forms in the seed trays. In many instances, the farmer is forced to accept the dry pockets as waste and continue to raise the seedlings that have taken.

The conventional method of filling seed trays with a loading device, or hopper, allows for a great number of seed trays to be filled in a relatively short time period but, the formation of dry pockets is a major drawback.

The hopper is generally filled with the filler material and maintained at full capacity during the filling process. The trays are pushed or otherwise conveyed, with a mechanical arm, for example, below the hopper while the filler material dumps into the trays so that all of the individual pockets in the tray are filled virtually simultaneously. The filler material tends to "bridge" across the pockets without filling the pocket completely. Air voids or spaces are formed in the pockets and, hence, dry pockets occur.

The present method for filling seed trays utilizes the advantages of a conventional hopper and mechanical vibrator and overcomes the noted disadvantages of the conventional devices by minimizing the occurrence or formation of dry pockets altogether.

OBJECTS AND SUMMARY OF THE INVENTION

It is a principle object of the present invention to provide a method for filing seed trays which minimizes the probability of dry pockets forming in the bottom of the individual pockets of the seed trays.

A further object of the present invention is to provide a method for filling tobacco seed trays with a conventional filling apparatus while preventing the formation of dry pockets in the seed trays.

Still a further object of the present invention is to provide a method for enhancing the probability of successful tobacco seed germination in tobacco seed trays.

Yet a further object of the present invention is to provide a method for controlling the rate at which a tobacco seed tray is filled with filler material so that the entire volume of the pockets within the seed tray are filled with the material.

Still another object of the present invention is to provide a method for filling tobacco seed trays which promotes a wicking effect when the filled seed trays are placed or floated in water.

And yet a further object of the present invention is to provide a method for controlling the angle at which filler material is allowed to fall into the individual pockets of a seed tray thereby minimizing the chance of dry pockets forming in the seed tray.

Additional objects and advantages of the invention will be set forth in part in the description which follows, and in part will be obvious from the description or may be learned by practice of the invention. The objects and advantages of the invention may be realized and attained by means of the instrumentalities and combinations particularly pointed out in the appended claims.

The method of the present invention is applicable in filling seed trays in general. For each of illustration and clarity, the present method will be described as relating to filling tobacco seed trays. However, this is not a limitation upon the present invention, which is intended to cover filling seed trays in general.

To achieve the objects and in accordance with the purpose of the invention, as embodied and broadly described herein, a method is provided for filling a seed tray with filler material, the seed tray having a plurality of individual pockets defined therein forming repositories for tobacco seeds. The method comprises the steps of partially filling an upright loading device with filler material in a manner so that the surface plane of the filler material is at an inclined angle of repose with respect to a horizontal plane through the loading device and so that a leading edge of the filler material is established and maintained at a distance from the front end of the loading device at least as great as the length of the individual pockets of the seed tray. The method further includes passing a seed tray below the loading device such that the forward edge of the seed tray initially passes below the leading edge of the filler material so that the filler material cascades down into the individual pockets of the seed tray at a controlled rate. The filler material is agitated, for example by mechanically vibrating the loading device, causing the filler material to fall from the leading edge into the pockets. The rate the seed tray is passed below the loading device is controlled so that the individual pockets of the seed tray are generally completely filled from the bottom up with the filler material before being conveyed under the bulk portion of the filler material. The method further includes replenishing the filler material in the loading device in such a manner so as to maintain the surface plane of the filler material at the prescribed inclined angle of repose.

In one preferred embodiment of the present method, the surface plane of the filler material is maintained at an angle of approximately 50° with respect to a horizontal plane through the loading device.

In another preferred embodiment of the invention, the method may include utilizing an automatic feeding device for filling the loading device and replenishing the filler material in the loading device.

The method may also comprise the step of mechanically vibrating the seed trays as they are passed below the loading device. Additionally, the method may further include mechanically vibrating the loading device as the seed trays are passed below to enhance the cascading action of the filler material into the individual pockets of the seed tray.

Also in accordance with the method of the present invention, the seed tray may be passed below the loading device by conveying the seed trays with an automatic conveyor system, for instance an electric or pneumatic or hydraulic arm, whereby the step of controlling the rate the seed tray is passed below the loading device includes controlling the rate of speed of the conveyor system. This embodiment may further comprise conveying a continuous supply of seed trays below the loading device with the conveyor system.

To further achieve the objects and in accordance with the present invention, a method is provided for preventing the formation of dry pockets among the individual pockets of a tobacco seed tray thereby increasing the germination rate of tobacco seeds deposited in the seed tray. This method comprises partially filling a hopper with filler material to be deposited into the pockets of the seed tray. The method further includes the step of forming the filler material within the hopper so that the filler material has an upper planar surface forming an inclined angle of repose with a horizontal plane through the hopper and a leading edge set back a predetermined distance from the front side of the hopper. A seed tray is conveyed below the hopper while agitating the filler material so that the filler material is deposited into the individual pockets of the seed tray as the pockets pass below the leading edge of the filler material. The method further includes controlling the degree of agitation of the filler material so that the individual pockets of the seed tray are generally completely filled before the trailing edge of the pocket passes below the leading edge of the filler material. The method further includes vibrating the seed tray as it passes below the hopper to settle the filler material within the pockets.

In a further preferred embodiment of the method of the present invention, a wetting agent is mixed with the filler material before it is deposited in the pockets of the seed tray. The wetting agent enhances the wicking action in the individual pockets.

The accompanying drawings, which are incorporated in and constitute a part of the specification, illustrate one embodiment of the invention, and together with the descriptions serve to explain the principles of the invention.

BRIEF DESCRIPTION OF THE DRAWINGS

A full and enabling disclosure of the present invention, including the best mode thereof, directed to one of ordinary skill in the art, is set forth in the remainder of the specification, which makes reference to the appended figures in which:

FIG. 4 particularly depicts the formation of dry pockets in the three pockets illustrated in the figure.

FIG. 5 illustrates the pockets being completely filled with filler material without dry pockets forming therein.

FIG. 6 particularly illustrates tobacco seedlings germinating and growing in completely filled pockets as compared to a dry pocket. FIG. 6 further depicts the seed tray floating in a water pool.

Figure 1:
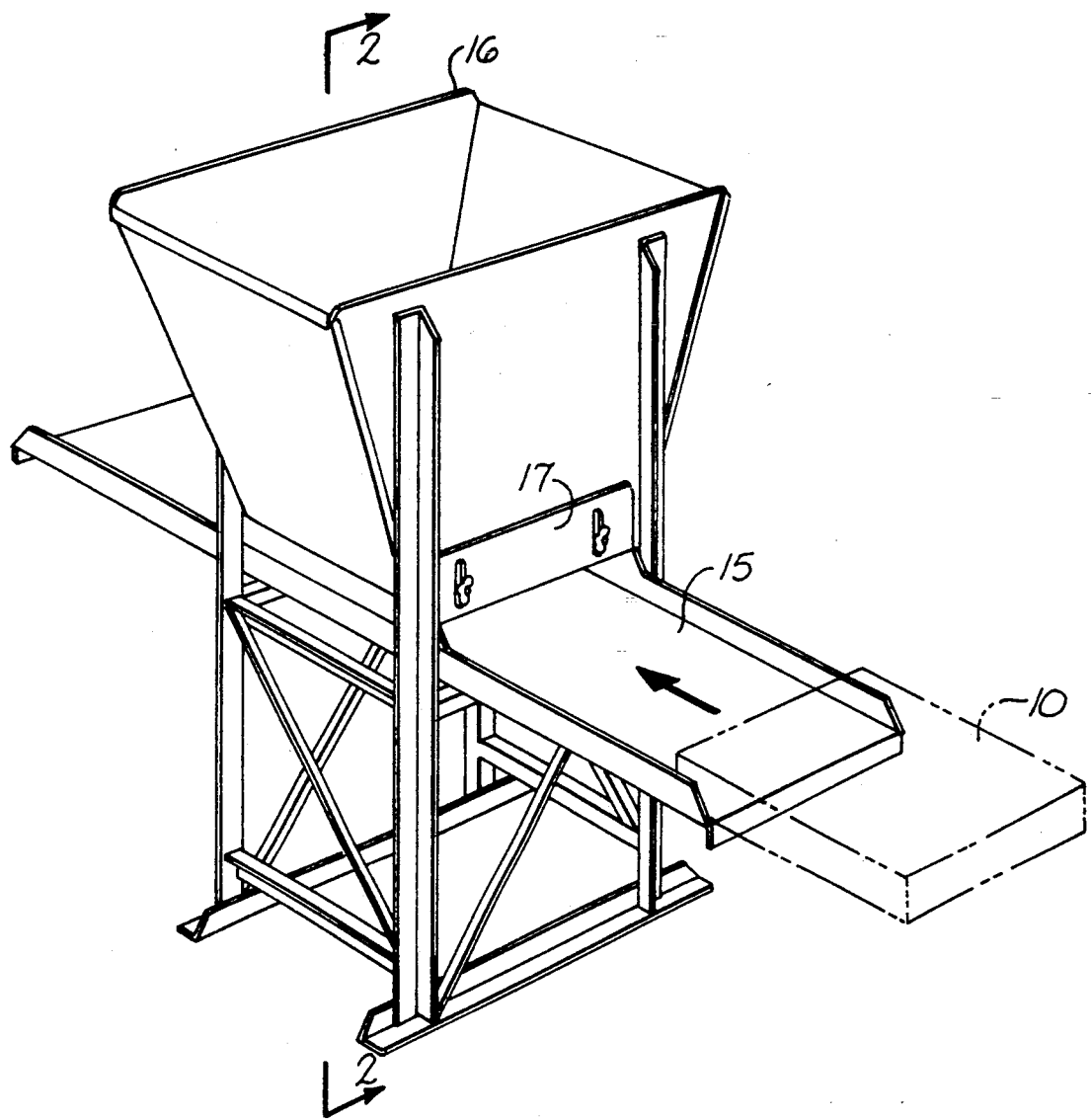
FIG. 1 is a perspective view of a loading device to be utilized in practicing the method of the present invention. A seed tray is depicted by dashed lines in the figure.

Repeat use of reference characters in the following specification and appended drawings is intended to represent the same or analogous features, elements, or steps of the present invention.

DETAILED DESCRIPTION OF THE PREFERRED EMBODIMENTS

Reference will now be made in detail to the presently preferred embodiments of the invention, one or more examples of which are illustrated in the accompanying drawings. Each example is provided by way of explanation of the invention, not limitation of the invention. In fact, it will be apparent to those skilled in the art that various modifications and variations can be made in the present invention without departing from the scope or spirit of the invention. For instance, steps or features illustrated or described as part of one embodiment, can be used on another embodiment to yield still a further embodiment of the method according to the present invention. Thus, it is intended that the present invention cover such modifications and variations as come within the scope of the appended claims and their equivalents.

The method according to the present invention is depicted generally through a combination of the figures. Referring to FIGS. 3 through 6 in particular, the method according to the present invention is concerned with filling seed tray 10 with filler material 12. In a preferred embodiment, the present method is used for filling tobacco seed trays. The following description will refer to tobacco seed trays for clarity sake, and not as a limitation of the invention.

Figure 3:
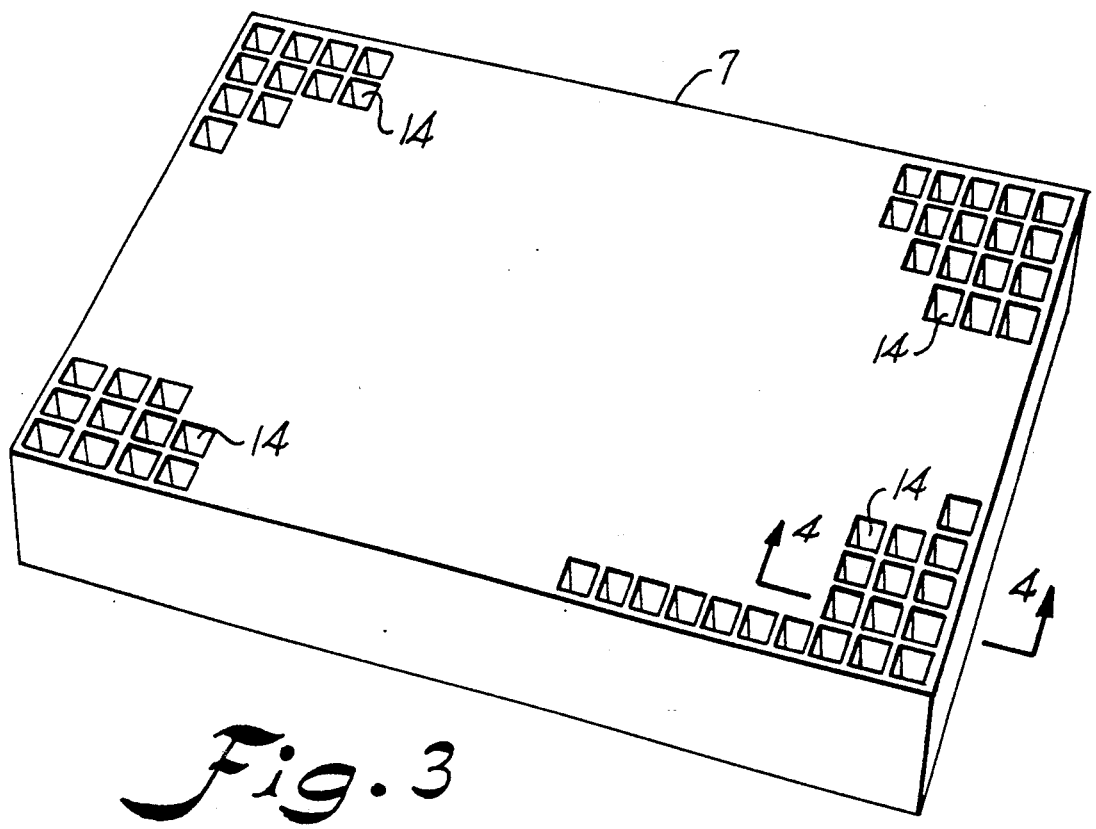
FIG. 3 is a perspective view of a conventional seed tray with rows of individual pockets for use in practicing the method of the present invention.

Seed tray 10 has a plurality of individual pockets 14 defined therein. Pockets 14 may, for instance, be arranged in rows, as shown in FIG. 3. A conventional seed tray 10 has typically 12 rows of 24 pockets. However, the method according to the present invention is not limited to any particular size seed tray 10 or particular number of pockets 14 within tray 10.

Figure 4:
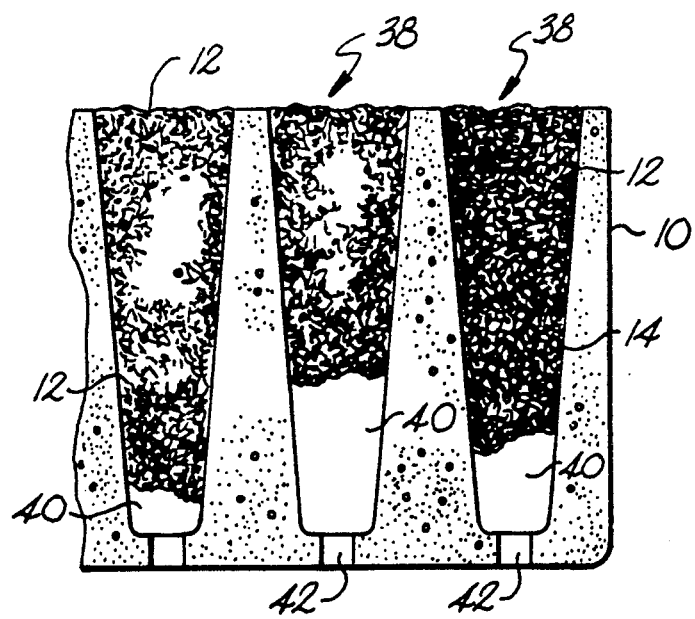
FIG. 4 is a partial perspective view of the seed tray of FIG. 3 shown in partial cut-away.

FIG. 4 illustrates the undesirable dry pocket condition discussed above in the background of the invention. Particular individual pockets 14 are termed "dry pockets" 38 since air spaces or voids 40 have formed at the bottom of these pockets. Each individual pocket 14 contains a hole 42 in the bottom thereof. Hole 42 leads through seed tray 10. Once trays 10 have been filled with filler material 12, tobacco seeds 32 are deposited in depressions made in the top of filler material 12 within each pocket 14. Trays 10 are then placed in a pool of water 36 as illustrated in FIG. 6.

If individual pockets 14 are completely filled with filler material 12, then seed 32 will germinate and tobacco seedlings 34 will grow. Pockets 14 must be initially completely filled with filler material 12 in order for germination and growth of seedlings 34 to occur. Filler material 12 draws or wicks water from pool 36 through holes 42 in pockets 14. Pockets 14 must be completely filled with filler material 12 in order for the wicking process to draw moisture to the area of tobacco seed 32. Once seed 32 has germinated, the wicking action is important to promote root growth of seedling 34.

Figure 6:
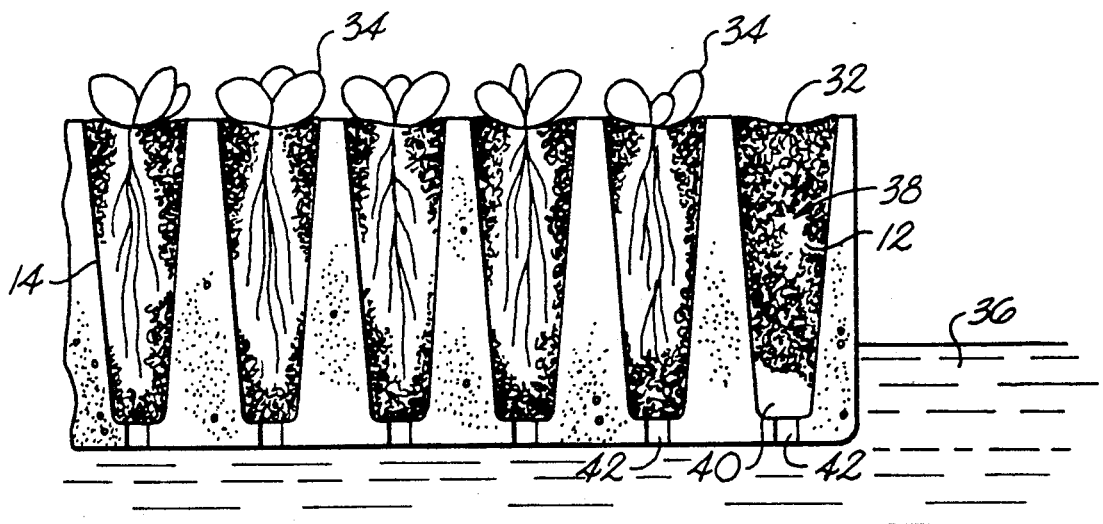
FIG. 6 is yet another partial perspective side view of a seed tray shown in partial cut-away.

As depicted in the rightmost pocket of FIG. 6, when a dry pocket 38 forms, an air space or void 40 has occurred in the pocket. The void 40 causes a discontinuity in filler material 12 and prevents moisture from reaching seed 32. Hence, the seed 32 will not germinate.

FIG. 4 better illustrates the formation of voids 40 within pockets 14. As mentioned above, it is virtually impossible to tell if a dry pocket 38 has formed until the tobacco seeds do not germinate on schedule. However, at that point, little can be done with dry pocket 38.

Figure 5:
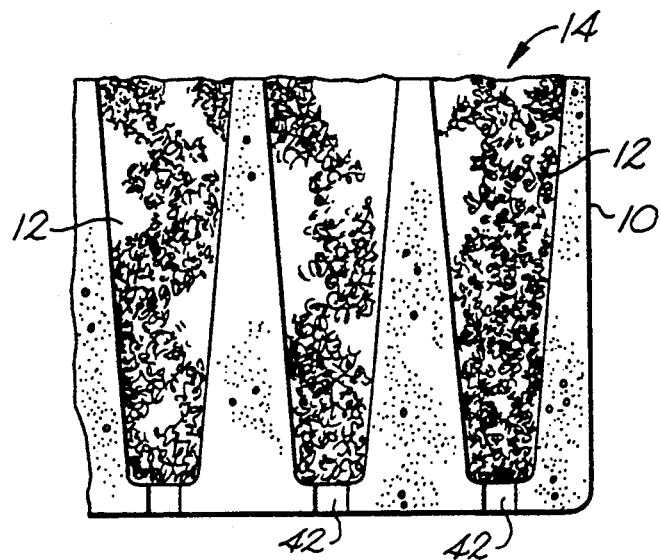
FIG. 5 is another perspective view of the individual pockets shown in FIG. 4.

FIG. 5 illustrates pockets 14 that have been properly filled with filler material 12. Pockets 14 are completely filled from the bottom thereof adjacent holes 42 to the top of pocket 14. In a properly filled pocket 14, as shown in FIG. 5, there are no discontinuities or voids in material 12. A seed 32 deposited in the pockets 14 of FIG. 5 will germinate once the tray is placed in a water pool 36.

Figure 2:
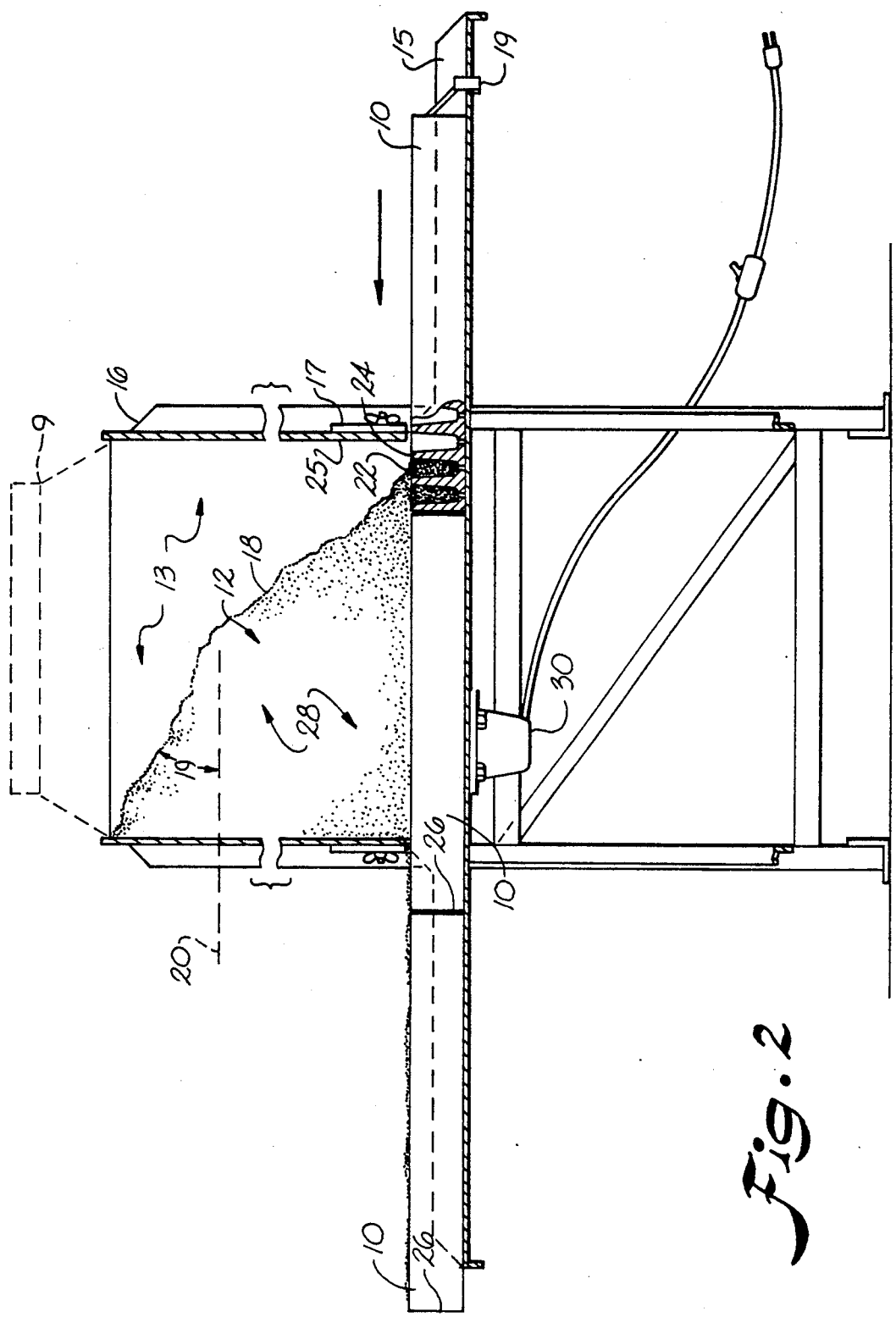
FIG. 2 is a side perspective view of the loading device of FIG. 1 shown in partial cut-away to reveal the filler material in the loading device. Seed trays are depicted being conveyed below the loading device.

The method according to the present invention minimizes the occurrence of dry pockets 38 in filling seed trays 10 with filler material 12. Referring to FIGS. 1 and 2 in general, the method according to the present invention calls for partially filling an upright loading device or hopper 16 with filler material 12 in such a manner that filler material 12 has an upper surface plane 18 at an inclined angle of repose 19 with respect to an imaginary horizontal plane 20 through hopper 16.

Surface plane 18 of filler material 12 ends in a leading edge 22. Leading edge 22 is maintained at a predetermined distance 24 from front end 25 of hopper 16. The step of filling hopper 16 with material 12 so as to achieve and maintain angle 19 involves precisely metering and controlling the fill rate of material 12 into hopper 16.

It is an important aspect of the present method that a leading edge 22 of material 12 be formed and set back distance 24 from front end 25 of hopper 16. Distance 24 is at least equal to the length of one of the individual pockets 14 contained in seed tray 10. A plate or like device may be precisely disposed within hopper 16 to form surface plane 18 of material 12 and to establish leading edge 22 of the material.

In one embodiment of the method of this invention, the step of filling loading device 16 with material 12 may be accomplished through means of an automatic feeding system 9 whereby a continuous supply of filler material 12 is metered into hopper 16. The automatic feeding device and hopper 16 may comprise an integral structure, or the two may be maintained separate. Typically, filler material 12 is sold in bags or sacks. In one embodiment of the present method, hopper 16 may be filled manually from above by pouring material 12 from the bags directly into hopper 16 in a controlled manner.

A conventional loading device or hopper 16 is depicted generally in FIGS. 1 and 2. It should be understood that the actual size, shape, and capacity, of hopper 16 is not important to the method of the claimed invention. For example, any known or available loading device 16 can be employed in the method of this invention. Typically, loading device 16 has a tray surface 15 which runs generally below the loading bin portion of the device, as in FIG. 1. Device 16 may further comprise an adjustable plate 17 at the front end 25 thereof. Plate 17 can be adjusted in height to correspond to the height of trays 10 to be passed therebelow.

As shown in FIG. 2, hopper 16 typically contains a storage or bin portion 13 into which material 12 is loaded. Typically, portion 13 is open at the bottom and material 12 is free to flow therethrough. However, the present method is not limited to use with any particular structure of bin 13. For instance, bin 13 may comprise an internal structure such as a plate or baffle (not shown) to aid in establishing angle 19 of material surface plane 18 and leading edge 22. Bin 13 may also have a bottom plate (not shown) to limit the amount of bulk portion 28 of material 12 which is free to fall through bin 13.

The method according to present invention further includes passing tobacco tray 10 below loading device 16 such that forward edge 26 of tray 10 initially passes below leading edge 22 of filler material 12. In this manner, each pocket 14 of seed tray 10 is filled with material 12 from the vicinity of leading edge 22. In other words, filler material 12 at leading edge 22 falls or cascades into individual pockets 14, as shown in FIG. 2. The greater the angle of repose 19 of planar surface 18, the greater the fill rate of pockets 14 with material 12.

The present method further calls for controlling the rate seed tray 10 is passed below loading device 16 so that individual pockets 14 are generally completely filled from the bottom up with filler material 12 before being conveyed under bulk portion 28 of material 12. In this manner, filler material 12 cannot bridge across pockets 14 creating voids 40 resulting in dry pockets 38. If material 12 is allowed to flow or cascade from leading edge 22 into pockets 14 before the pockets are passed under bulk portion 28 of material 12, then the chance of dry pockets forming is greatly minimized.

The present method also calls for replenishing filler material 12 in loading device 16 at a rate so as to maintain surface plane 18 at the prescribed angle of repose 19.

As seed trays 10 are conveyed through loading device 16, pockets 14 are initially filled from leading edge 22 of material 12. The pockets then pass under bulk portion 28 of material 12. It is desirable to have at least a portion of bulk 28 free to drop into trays 10. In this manner, bulk portion 28 tends to compress and settle material 12 within pockets 14.

The present method may also include the step of mechanically vibrating seed trays 10 as they pass below loading device 16 to settle filler material 12 within pockets 14 in a preferably uniform density. As shown in FIG. 2, mechanical vibrator 30 may be provided for mechanically shaking or vibrating tray surface 15 upon which seed trays 10 rest. Any suitable vibrator device may be employed to accomplish this step.

The present method may also include the step of mechanically vibrating loading device 16 as trays 10 are passed below to enhance the cascading action of filler material 12. For example, mechanical vibrator 30 may be mounted upon hopper 16 to accomplish this step. In another embodiment, both tray 10 and hopper 16 may be vibrated simultaneously. This step may be accomplished, for instance, by having tray surface 15 and hopper 16 being structurally connected and providing a single mechanical vibrator 30, as in FIG. 2.

As mentioned above, the present method may include the step of passing trays 10 below loading device 16 by conveying trays 10 with an automatic conveyor system 19, for example, a controllable mechanical arm or belt. In this embodiment of the present method, the step of controlling the rate trays 10 are passed below the device includes controlling the rate of the conveyor system. In this embodiment where a conveyor system is utilized, the present method may include conveying a continuous supply of trays 10 below loading device 16 with the conveyor system. However, the present method is just as applicable to the process where trays 10 are manually conveyed below device 16.

The method of preventing the formation of dry pockets in the seed trays according to the present invention may also include the step of adding a wetting agent to the filler material. The wetting agent enhances the wicking action in the individual pockets 14 of trays 10. A number of commercially available wetting agents are known to those in the art, any one of which can be employed in the method of this invention. However, the addition of a wetting agent to filler material 12 will not prevent the formation of dry pockets in trays 10. The wetting agent only enhances the wicking action in pockets 14 if the pockets are initially completely filled with filler material 12. If an air void 40 is formed in the pocket, the addition of a wetting agent to the filler material will have no benefit and the seed still will not germinate.

It will be apparent to those skilled in the art that various modifications and variations can be made in the apparatus and method of the present invention without departing from the scope or spirit of the invention. For example, the present method may be practiced with any conventional loading device or hopper. Thus, it is intended that the present invention cover the modifications and variations of this invention provided they come within the scope of the appended claims and their equivalents.

What is claimed is:

1. A method for filling a seed tray with filler material, the seed tray having a plurality of individual pockets defined therein forming repositories for seeding, the pockets having a bottom and predetermined length, said method comprising the steps of:

partially filling an upright loading device having a front end with filler material in a manner so that a top surface plane of the filler material is formed at an inclined angle of repose with respect to a horizontal plane through the loading device so that a leading edge of the filler material is maintained at a predetermined distance from the front end of the loading device, the distance being at lest as great as the length of the individual pockets of the seed tray;

passing a seed tray having a forward edge at a relatively constant rate below the loading device such that the forward edge of the seed tray initially passes below the leading edge of the filler material;

agitating the filler material to cause the filler material to cascade from the leading edge down into the individual pockets of the seed tray at a controller rate;

controlling the rate the seed tray is passed below the loading device so that the individual pockets of the seed tray are generally completely filled from the bottom up with the filler material before being completely conveyed under the leading edge of the filler material; and replenishing the filler material in the loading device in such a manner so as to maintain the surface plane of the filler material at the prescribed inclined angle of repose.

2. The method as in claim 1, wherein the top surface plane of the filler material is maintained at an angle of approximately 50 degrees with respect to a horizontal plane through the loading device.

3. The method as in claim 1, including utilizing an automatic feeding device for said steps of partially filling the loading device and replenishing the filler material in the loading device.

4. The method as in claim 1, further comprising the step of mechanically vibrating type seed tray as it is passed below the loading device.

5. The method as in claim 1, further comprising the step of mechanically vibrating the loading device as the seed tray is passed below to enhance the cascading action of the filler material.

6. The method as in claim 1, wherein said step of passing the seed tray below the loading device includes conveying the seed tray with an automatic conveying system having a conveying rate of speed whereby said step of controlling the rate the seed tray is passed below the loading device includes controlling the rate of speed of the conveying system.

7. The method as in claim 6, further comprising conveying a continuous supply of the seed trays below the loading device with the conveying system.

8. The method as in claim 1, wherein the step of passing the seed tray below the loading device includes manually pushing the seed tray below the loading device.

9. A method for preventing dry pockets in a tobacco seed tray having a plurality of individual pockets thereby increasing t he germination rate of tobacco seeds deposited in the seed tray, the method comprising:

partially filling a hopper having a front side with filler material to be deposited into the pockets of the seed tray;

forming the filler material within the hopper so that the filler material has a top planar surface forming an inclined angel of repose with a horizontal plane through the hopper and a leading edge set back a predetermined distance from the front side of the hopper;

conveying a seed tray below the hopper while agitating the filler material so that the filler material falls into the individual pockets of the seed tray as the pockets pass below the leading edge of the filler material; and vibrating the seed tray as it passes below the hopper to settle the filler material within the pockets.

10. The method as in claim 9, further comprising the step of adding a wetting agent to the filler material to enhance wicking action in the individual pockets of the seed tray.

11. A method for increasing the germination rate of tobacco seeds deposited in individual pockets of a tobacco seed tray by minimizing dry pockets in filler material deposited into the tobacco seed tray, the method comprising:

depositing the filler material into a loading hopper having a front side;

establishing a leading edge of filler material within the loading hopper set back a distance from the front side of the hopper; and conveying the seed tray below the hopper so that the individual pockets of the seed tray pass below the leading edge of the filler material and are generally completely filled with the filler material before the pockets passes beyond the leading edge of the filler material, the pockets being filled from the bottom up by filler material falling from the leading edge of the filler material into the pockets.

12. The method as in claim 11, further comprising the step of mechanically vibrating the seed tray as it passes below the loading hopper to settle the filler material in the individual pockets of the seed tray.

13. The method as in claim 11, further comprising conveying a continuous supply of seed trays below the loading hopper and replenishing the filler material in the loading hopper so that a continuous stream of seed trays can be filled.

14. The method as in claim 11, further comprising adding a wsetting agent to the seed tray filler material before the filler material is deposited into the seed tray.

* * * * *